(12) United States Patent
Collette

(10) Patent No.: US 8,123,169 B2
(45) Date of Patent: Feb. 28, 2012

(54) VERTICAL NON-BLADDERED FUEL TANK FOR A DUCTED FAN VEHICLE

(75) Inventor: Daniel Ross Collette, Albuquerque, NM (US)

(73) Assignee: Honeywell International Inc., Morristown, NJ (US)

(*) Notice: Subject to any disclaimer, the term of this patent is extended or adjusted under 35 U.S.C. 154(b) by 556 days.

(21) Appl. No.: 12/269,132

(22) Filed: Nov. 12, 2008

(65) Prior Publication Data

US 2010/0116827 A1 May 13, 2010

(51) Int. Cl.
*B64D 37/02* (2006.01)
(52) U.S. Cl. ............ 244/135 R; 137/574; 137/590
(58) Field of Classification Search .......... 244/135 R, 244/135 B, 135 C; 220/562, 563, 564, 0.6, 220/581, 585, 4.15, 4.14, 592, 646, 647, 220/650; 137/264, 590, 574
See application file for complete search history.

(56) References Cited

U.S. PATENT DOCUMENTS 2,609,118 A * 9/1952 Cattaneo ................. 220/723
(Continued)

FOREIGN PATENT DOCUMENTS

EP       1767453 A1    3/2007
(Continued)

*Primary Examiner* — Kaitlin Joerger
(74) *Attorney, Agent, or Firm* — Shumaker & Sieffert, P.A.

(57) ABSTRACT

A vertical non-bladdered fuel tank for a ducted fan vehicle comprising: a pod that releasably connects to a core vehicle of a ducted fan vehicle, a vertical fuel tank contained by the pod, wherein the vertical fuel tank is centered between the fore and aft sides of the pod, an outlet in a floor of the vertical fuel tank located adjacent to a sidewall on the fore side of the vertical fuel tank, wherein the outlet is coupled to a draw tube contained by the core vehicle, and a pressure release vent located at the highlight of the pod's duct.

17 Claims, 3 Drawing Sheets

U.S. PATENT DOCUMENTS

| | | | |
|---|---|---|---|
| 2,719,583 A * | 10/1955 | Malick | 137/210 |
| 4,489,745 A * | 12/1984 | Netter et al. | 137/209 |
| 4,860,972 A | 8/1989 | Lannerd et al. | |
| 5,150,857 A | 9/1992 | Moffitt et al. | |
| 5,152,478 A | 10/1992 | Cycon et al. | |
| 5,240,038 A * | 8/1993 | Canedi | 137/574 |
| 5,295,643 A | 3/1994 | Ebbert et al. | |
| 5,575,438 A | 11/1996 | McGonigle et al. | |
| 5,695,153 A | 12/1997 | Britton et al. | |
| 5,888,393 A * | 3/1999 | Luhman et al. | 210/510.1 |
| 5,983,945 A | 11/1999 | Salmon | |
| 6,021,978 A * | 2/2000 | Goss | 244/129.2 |
| 6,170,778 B1 | 1/2001 | Cycon et al. | |
| 6,450,445 B1 | 9/2002 | Moller | |
| 6,584,382 B2 | 6/2003 | Karem | |
| 6,604,706 B1 | 8/2003 | Bostan | |
| 6,691,949 B2 | 2/2004 | Plump et al. | |
| 6,721,646 B2 | 4/2004 | Carroll | |
| 7,032,861 B2 | 4/2006 | Sanders, Jr. et al. | |
| 7,044,422 B2 | 5/2006 | Bostan | |
| 7,249,732 B2 | 7/2007 | Sanders, Jr. et al. | |
| 7,357,355 B2 * | 4/2008 | Howe | 244/135 R |
| 2004/0094662 A1 | 5/2004 | Sanders, Jr. et al. | |
| 2004/0129828 A1 | 7/2004 | Bostan | |
| 2005/0082421 A1 | 4/2005 | Perlo et al. | |
| 2006/0049304 A1 | 3/2006 | Sanders, Jr. et al. | |
| 2006/0192047 A1 | 8/2006 | Goossen | |
| 2006/0231675 A1 | 10/2006 | Bostan | |
| 2007/0034738 A1 | 2/2007 | Sanders, Jr. et al. | |
| 2007/0051848 A1 | 3/2007 | Mantych et al. | |
| 2007/0193650 A1 | 8/2007 | Eannati | |
| 2007/0221790 A1 | 9/2007 | Goossen | |
| 2007/0228214 A1 | 10/2007 | Horak | |
| 2007/0244608 A1 | 10/2007 | Rath et al. | |
| 2007/0262195 A1 | 11/2007 | Bulaga et al. | |
| 2007/0295298 A1 | 12/2007 | Mark | |

FOREIGN PATENT DOCUMENTS

| | | |
|---|---|---|
| EP | 1767453 B1 | 6/2008 |
| WO | 0015497 | 3/2000 |
| WO | 2004002821 | 1/2004 |

* cited by examiner

VERTICAL NON-BLADDERED FUEL TANK FOR A DUCTED FAN VEHICLE

GOVERNMENT RIGHTS

The United States government may have certain rights in this invention pursuant to Government Contract # W56HZV-05-C-0724 with the U.S. Army (TACOM).

BACKGROUND OF THE INVENTION

In conventional micro-air vehicles and other ducted fan unmanned aerial vehicles, the vertical duct is unified and indivisible. Within this indivisible duct, the fuel is typically contained in a shallow, horizontal bladder that lies around the duct. The bladder contains a piccolo tube that similarly circles the entire duct. The piccolo tube comprises an elongated section of tubing that includes one or more openings for taking up fuel from the fuel bladder. The piccolo tube is in turn connected to downstream hoses to facilitate fuel delivery to the engine.

As the engine consumes the fuel contained in the fuel bladder, the air/fuel ratio inside the bladder increases. As the air/fuel ratio reaches high levels (e.g., greater than 1:1), the chances of air or fuel vapor ingestion increases. Thus, when the aerial vehicle pitches forward or banks to the side, all the fuel will rush to one side exposing the remainder of the piccolo tube to air in the bladder, which then allows air to be drawn into the fuel line.

When the engine ingests air or fuel vapor, it typically stalls. With conventional piccolo tubes, the engine often stalls due to air and/or fuel vapor ingestion prior to consumption of all of the fuel contained in the fuel bladder. As a result, the run time of the engine is unduly shortened. Additionally, closed (i.e., unvented) fuel systems conventionally rely on the integrity of the vacuum created and maintained within sealed containers or collapsible bladders to prevent the intrusion of air and/or vapor into the system. Such systems generally do not provide countermeasures to remove internally generated fuel vapor and/or air that enters due to improper fueling or leaks. Accordingly, the total volume of air and/or fuel vapor inside the various components (e.g., fuel bladders, tanks, lines, etc.) of a closed system can reach critical levels capable of progressing through the fuel lines into the engine and thereby inducing engine-seizure.

In order to counteract this, wicking filters have been implemented around the piccolo tube. These wicking filters use the capillary transport properties of a wicking material to increase the amount of fuel that can be reliably drawn by a piccolo tube prior to engine seizure or fuel starvation, even in the presence of excessive ratios of air to fuel (e.g., greater than 1:1), and despite variations in temperature, altitude, and orientation.

The wicking material can be associated with the piccolo tube and can have numerous microporous conduits that extend within a fuel container. The wicking material expands the accessible fuel region within the bladder to nearly any location within the bladder that the wicking material contacts. As a result, the proportion of fuel within the bladder that is consumed prior to engine seizure or fuel starvation is increased.

The configuration of a shallow, horizontal fuel bladder, piccolo tube and wicking filter has several drawbacks. For instance, the bladder is difficult to manufacture and install within the duct without leaks. The bladder can also develop kinks and is a closed, unvented fuel container that increases the likelihood of introducing air into the fuel line. In addition, refueling the bladder is difficult and time consuming, which exposes soldiers to possible enemy fire. The refuel timing issue is exacerbated at night when it is very difficult, if not impossible, to observe the fueling process to ensure that no air is introduced into the fuel system. Further, a fueling syringe or auto fueler is required, which adds additional equipment requirements and weight. Moreover, as the fuel is consumed, the aerial vehicle's center of gravity is significantly altered leading to vehicle instability.

SUMMARY OF THE INVENTION

The discovery presented herein outlines a vertical non-bladdered fuel tank and a method and system for implementing the same on a UAV, which has a beneficial effect on the overall change in the center of gravity during flight. The vertical non-bladdered fuel tank also has a beneficial effect on refueling time and simplifies the refueling process.

Thus, in a first aspect, the present invention provides a vertical non-bladdered fuel tank for a ducted fan vehicle comprising: (a) a pod that releasably connects to a core vehicle of a ducted fan vehicle, (b) a vertical fuel tank contained by the pod, wherein the vertical fuel tank is centered between the fore and aft sides of the pod, (c) an outlet in a floor of the vertical fuel tank located adjacent to a sidewall on the fore side of the vertical fuel tank, wherein the outlet is coupled to a draw tube contained by the core vehicle, and (d) a pressure release vent located at the highlight of the pod's duct.

The present invention further provides a vertical non-bladdered fuel tank system for a ducted fan vehicle comprising: (a) one or more pods releasably attached to a core vehicle of a ducted fan, (b) a vertical fuel tank contained by each of the one or more pods, wherein each vertical fuel tank is centered between the fore and aft sides of each pod, (c) an outlet in a floor of each vertical fuel tank located adjacent to a sidewall on the fore side of each vertical fuel tank, wherein the outlet is coupled to one or more draw tubes contained by the core vehicle, and (d) a pressure release vent located at the highlight of the duct of each pod.

The present invention also provides a method for refueling a ducted fan vehicle utilizing a pod containing a vertical non-bladdered fuel tank comprising: (a) detaching a spent fuel pod from a connector on a core vehicle, wherein the spent fuel pod comprises (i) a vertical fuel tank centered in between the fore and aft sides of the pod, (ii) an outlet in a floor of the vertical fuel tank located adjacent to a sidewall on the fore side of the vertical fuel tank, wherein the outlet is coupled to a draw tube contained by the core vehicle, and (iii) a pressure release vent located at the highlight of the pod's duct, and (b) attaching a prefilled fuel pod to the core vehicle, wherein the prefilled fuel pod has the same configuration as the spent fuel pod.

DETAILED DESCRIPTION OF THE PREFERRED EMBODIMENT

Figure 1:
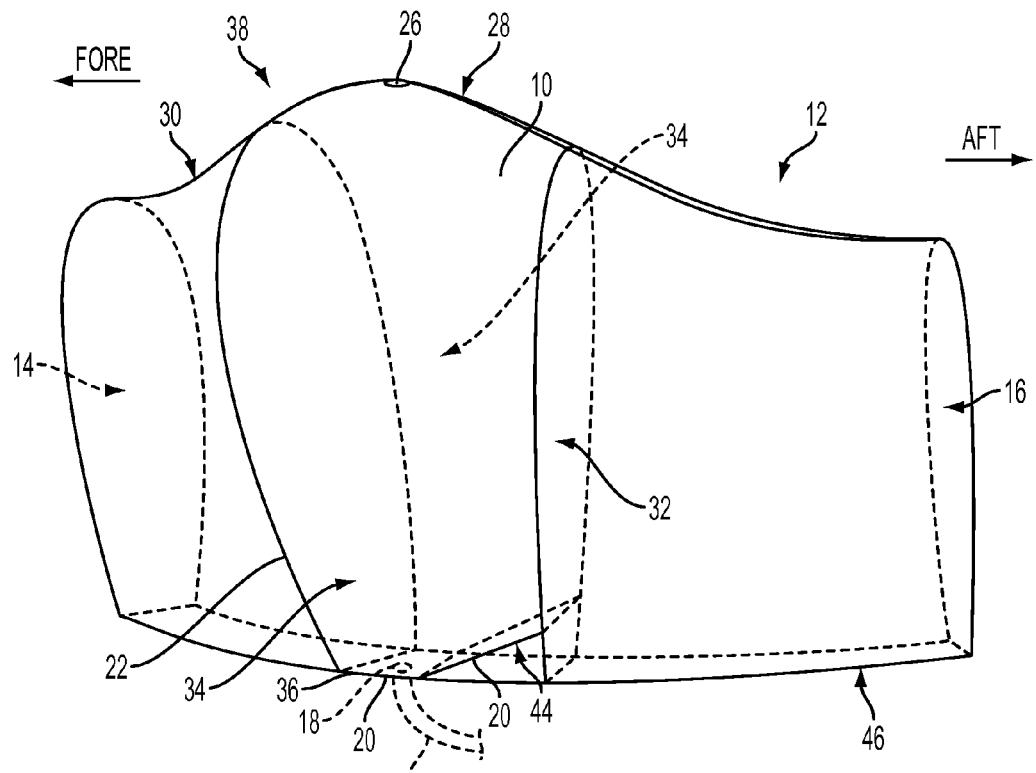
FIG. 1 is a perspective view of one embodiment of the vertical non-bladdered fuel tank.

In a first aspect, the present invention provides a vertical non-bladdered fuel tank 10 for a ducted fan vehicle comprising: (a) a pod 12 that releasably connects to a core vehicle of a ducted fan vehicle, (b) a vertical fuel tank 10 contained by the pod 12, wherein the vertical fuel tank 10 is centered between the fore and aft sides 14, 16 of the pod 12, (c) an outlet 18 in a floor 20 of the vertical fuel tank 10 located adjacent to a sidewall 22 on the fore side of the vertical fuel tank 10, wherein the outlet 18 is coupled to a draw tube 24 contained by the core vehicle, and (d) a pressure release vent 26 located at the highlight 28 of the pod's duct 30.

As used herein, a pod 12 is a streamlined, detachable housing that may contain various payloads, such as weapons or fuel. The pods 12 connect to a core vehicle to form a complete duct on a UAV. The arrangement of the various pods 12 relative to one another is limited only by the location of the connectors on the core vehicle, the desired center of gravity, and other basic operating parameters.

Figure 2:
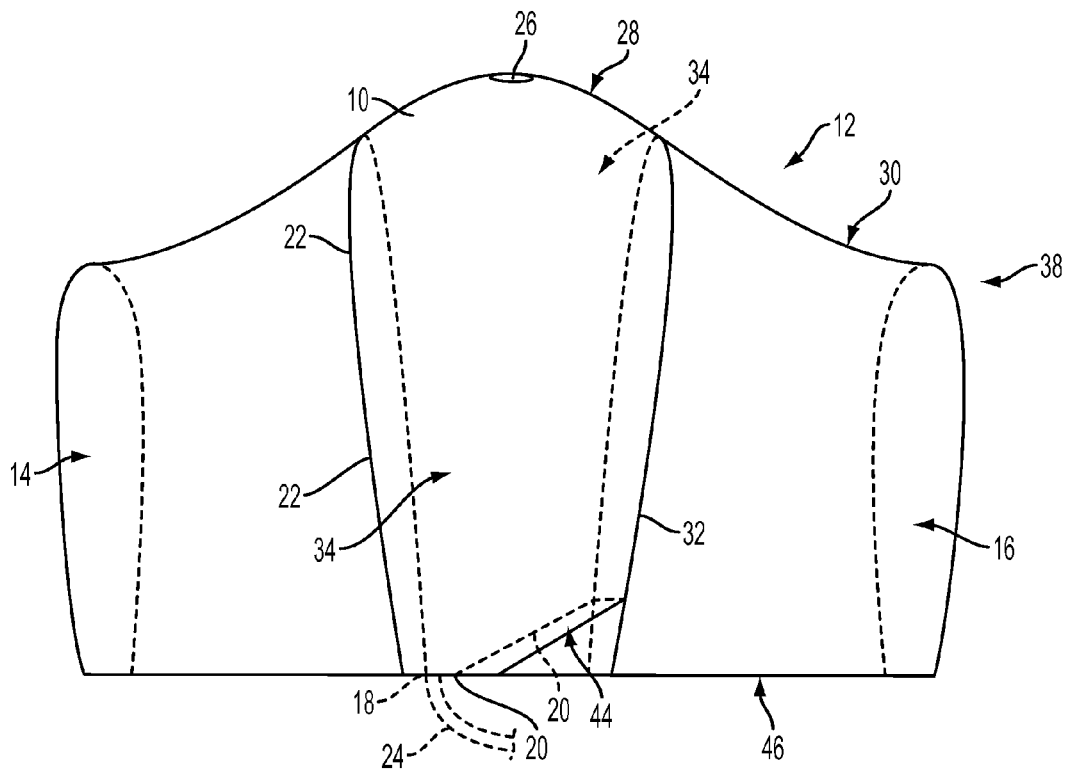
FIG. 2 is rear view of another embodiment of the vertical non-bladdered fuel tank.

As used herein, a vertical fuel tank 10 is contained within a pod 12 such that the tank 10 is centered between the fore and aft sides of the pod 14, 16 (see FIGS. 1-2). The total volume contained by the tank 10 is dependent on the amount of fuel estimated to be required for the various missions assigned to the UAV and on the locations of sidewalls 22, 32 within the duct. Moving the sidewalls 22, 32 further apart would increase the amount of fuel. This means the location of the fuel tank's sidewalls 22, 32 within the pod 10 between the fore and aft ends 14, 16 can extend to the sidewalls 22, 32 of the pod 12 itself or extend more narrowly towards the center of the pod 12, as shown in FIG. 1, such that enough fuel would be available for any perceived flight duration. In addition, the exterior surfaces 34 and horizontal floor surface 36 of the tank are shared, meaning congruent, with the pod surface. In one embodiment, the exterior surfaces 34, sidewalls 22, 32, and floor surfaces 20 are made of the same material as the internal surface of the pod 12. In another embodiment, the vertical fuel tank 10 may house a liner that is more resistant to breakdown when in contact with gas than the pod surface.

As used herein, the outlet 18 in the floor of the vertical fuel tank 10 is located adjacent to or near the sidewall 22 on the fore side of the vertical fuel tank 10 and is connected to a draw tube 24 in the core vehicle, which supplies fuel to the engine. The outlet 18 is near the fore-side sidewall 22 since the UAV tilts in the fore direction during flight causing the fuel to pool against the fore-side sidewall 22 and along the portion of the floor closest to that fore-side sidewall 22. Placing the outlet 18 under the pool of fuel ensures that the draw tube 24 is pulling only fuel, and not air, from the fuel tank 10 into the engine. This is an important feature because if enough air enters the draw tube 24 this will result in vapor lock in the engine and the UAV may be lost.

As used herein, the pressure release vent 26 allows air to enter the fuel tank 10 to maintain atmospheric pressure in the tank 10 as fuel is pulled into the drawn tube. The pressure release vent 26 is located at the highlight of the pod's duct, which is the top most portion of the duct lip. By locating the vent 26 at the highlight fuel will not spill out of the tank 10. The pressure release vent 26 could be located anywhere along the highlight between the tank's fore and aft sidewalls 22, 32, but is preferably located substantially halfway between the two sidewalls 22, 32. The vent 26 opening conforms to the aerodynamic shape of the duct 30.

Figure 3:
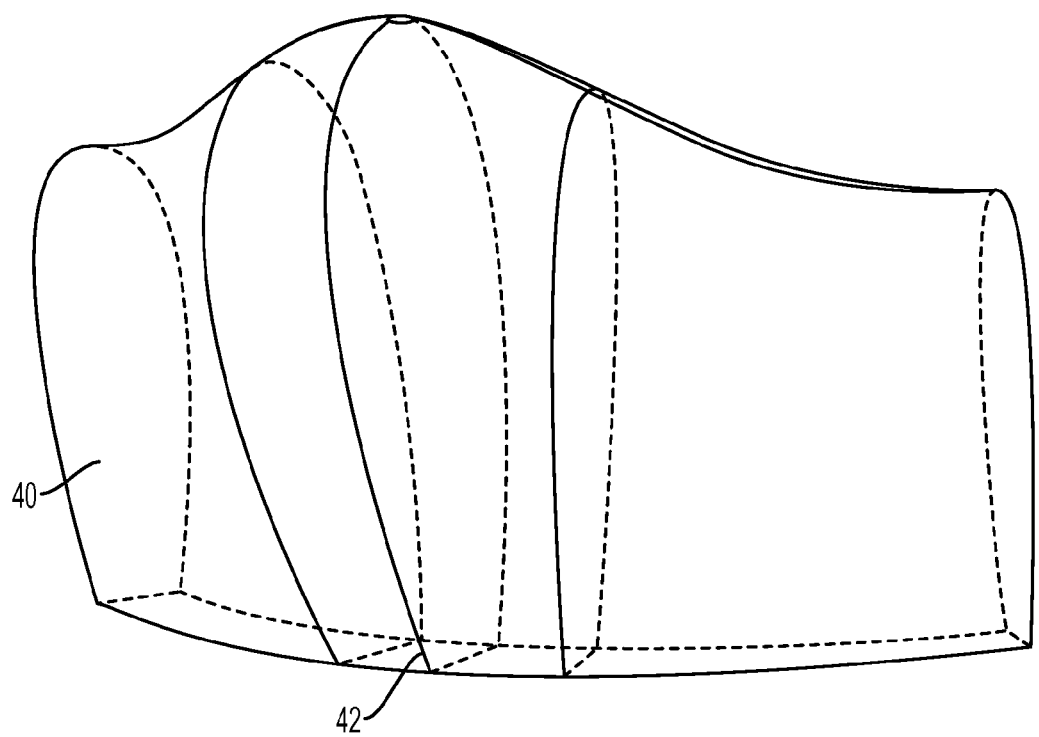
FIG. 3 is a perspective view of the cross-sections of the pod and vertical non-bladdered fuel tank.
Figures 3A, 3B:
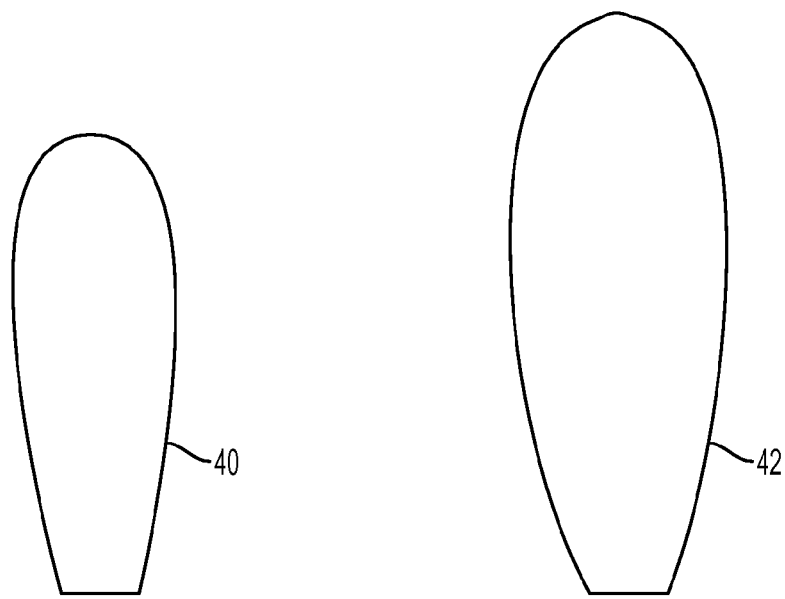
FIG. 3a is a cross-sectional view of the fore and aft ends of the pod.
FIG. 3b is a cross-sectional view of the center of the vertical fuel and pod.

In one embodiment, the pod 12 has a claw configuration 38. As used herein, a claw configuration 38, as shown in FIGS. 1-3, means that the pod 12 has an aerodynamically shaped cross-section 40, 42 that gradually expands in width and height between the fore and aft ends 14, 16 such that the pod's cross-section 42 is widest and tallest halfway between these two ends 14, 16. In other words, the fore and aft ends 14, 16 have substantially the same cross-section 40 and this cross-section expands in height and width relative to these ends 14, 16 the closer the cross-section is to the center of the pod 12. In addition, as shown in FIG. 1, the width of the cross-section near the floor 20 of the pod 12 remains relatively consistent along the length of the pod, whereas the width in the upper half of the cross-section is primarily where the expansion occurs. The additional height of the claw configuration's cross-section in the middle of the pod 12 allows the center of gravity to start slightly higher than the optimized location, then as fuel is consumed the center of gravity is lowered and ultimately moves slightly below the optimized center of gravity when the fuel is nearly consumed. This results in an optimized overall change in the center of gravity throughout the course of the UAV's flight.

In one embodiment, the floor 20 at the fore end of the vertical fuel tank 10 is horizontal 36 for a short distance relative to the pod 12 and then transitions to an inclined floor 44 that extends to the sidewall 32 on the aft side of the vertical fuel tank 10. The horizontal portion of the floor 36 accommodates the outlet 18 and any fittings to connect the draw tube 24 to the outlet 18. The purpose of the inclined floor 44 is to ensure that fuel remains concentrated at the fore-side of the tank 10 even when the UAV pitches in the aft direction. A UAV typically pitches one degree in the direction of flight for every 2 knots that the UAV is traveling. For instance, if the UAV is traveling backwards at 50 knots in the aft direction, then the UAV is pitched 25 degrees aft and the inclined floor 44 should be angled at 25 degrees to be horizontal relative to the ground. Thus, it is preferred that the floor 20 is inclined to accommodate at least the highest degree of pitch that the UAV may experience during backward flight to ensure that the fuel level does not pool on the aft side of the fuel tank 10. The UAV does not typically travel in the reverse direction for an extended period of time and the importance of the inclined floor 44 is only realized when fuel levels are substantially depleted during flight.

In one embodiment, the inclined floor 44 is angled at greater than zero degrees but less than or equal to 45 degrees. This configuration accommodates a UAV operating at up to 90 knots in the reverse direction.

In one embodiment, the sidewalls 22, 32 of the fuel tank 10 are substantially vertical relative to the floor of the pod 46. This embodiment contemplates that the fuel tank's side walls 22, 32 are substantially vertical relative to the horizontal floor 36.

In one embodiment, the outlet 18 is located at the center of the horizontal portion of the floor 36. Placing the outlet 18 midway between the port and starboard sides of the pod 12 accommodates the UAV's roll to one side or the other during flight.

In one embodiment, the vertical fuel tank 10 has a volume that is substantially one third of the volume of the pod 12. The volume of the fuel tank 10 relative to the volume of the overall pod 12 is important because the benefits realized by the claw configuration 38 related to the overall change in the center of gravity during flight are diminished as the volume of the fuel tank 10 is increased.

In one embodiment, the fore and aft sidewalls 14, 16 of the pod 12 and the vertical fuel tank 10 are coextensive such that the fuel tank 10 substantially fills the volume of the pod 12 except for the space between the inclined floor 44 and the floor of the pod 46. This embodiment maximizes the amount of fuel that can be used during flight.

In one embodiment, the fuel tank 10 contains anti-slosh foam. As used herein, the anti-slosh foam is a fuel additive that aids in preventing the formation of air bubbles in the fuel tank 10 which could be drawn into the engine and result in vapor lock.

As used herein, all the foregoing descriptions and embodiments with respect to the apparatus aspect are equally applicable to the following system and method aspects as well. Furthermore, all embodiments disclosed for each aspect may be combined with other embodiments.

In a second aspect, the invention provides a vertical non-bladdered fuel tank system for a ducted fan vehicle comprising: (a) one or more pods 12 releasably attached to a core vehicle of a ducted fan, (b) a vertical fuel tank 10 contained by each of the one or more pods 12, wherein each vertical fuel tank 10 is centered between the fore and aft sides of each pod 14, 16, (c) an outlet 18 in a floor 20 of each vertical fuel tank 10 located adjacent to a sidewall 22 on the fore side of each vertical fuel tank 10, wherein the outlet 18 is coupled to one or more draw tubes 24 contained by the core vehicle, and (d) a pressure release vent 26 located at the highlight 28 of the duct 30 of each pod 12.

In one embodiment, the one or more pods 12 have a claw configuration 38.

In one embodiment, the floor 20 of each vertical fuel tank 10 is horizontal 36 for a short distance relative to the pod 12 at the fore end and then transitions to an inclined floor 44 which extends to the sidewall 32 on the aft side of the vertical fuel tank 10.

In one embodiment, the inclined floor 44 is angled at greater than zero degrees but less than or equal to 45 degrees.

In one embodiment, the sidewalls 22, 32 of the fuel tank 10 are substantially vertical relative to the floor of the pod 46.

In one embodiment, the outlet 18 is located at the center of the horizontal portion of the floor 36.

In one embodiment, the one or more pods 12 includes one pod 12 on the port side of the core vehicle and one pod 12 on the starboard side of the core vehicle. As used herein, the port side is the left side of the UAV looking forward and the starboard side is the right side of the UAV looking forward.

In one embodiment, the fuel tank 10 in the pod 12 on the port side is connected to the fuel tank 10 in the pod 12 on the starboard side by a fuel line (not shown), wherein this fuel line is in a T-shape such that the port side and starboard side fuel tanks 10 share a joined fuel line to the engine. The fuel line constitutes the draw tube 24 and runs from the outlet 18 of the port side fuel tank 10 to the outlet 18 of the starboard fuel tank 10 in the core vehicle of the UAV. The fuel line branches off to connect with the engine creating a T-shape. Configuring the fuel line in this manner provides a vacuum that draws substantially equally from both fuel tanks 10.

Figure 4:
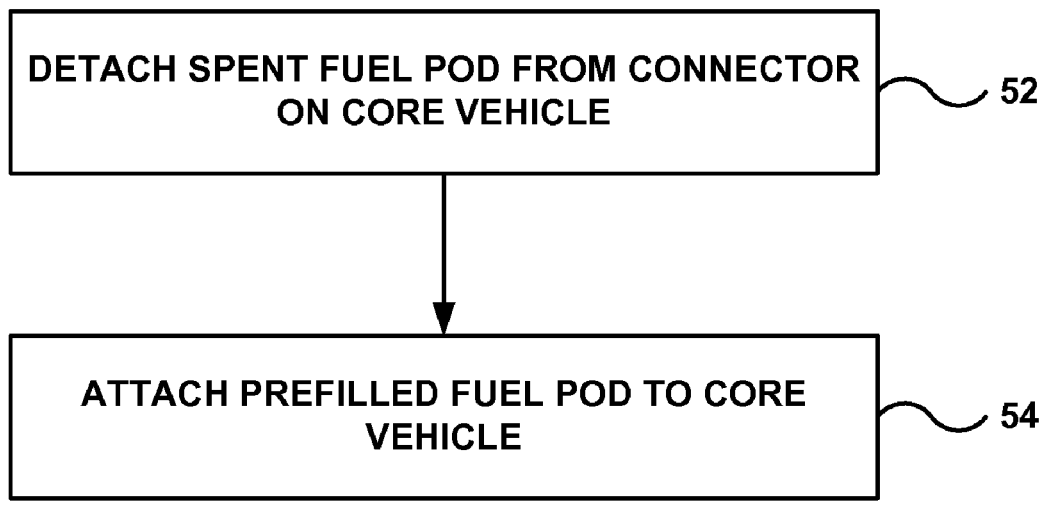
FIG. 4 is a flow diagram of an example method for refueling a ducted fan vehicle utilizing a pod containing a vertical non-bladdered fuel tank.

In a third aspect, as illustrated in the flow diagram of FIG. 4, the invention provides a method for refueling a ducted fan vehicle utilizing a pod 12 containing a vertical non-bladdered fuel tank 10 comprising: (a) detaching a spent fuel pod 12 from a connector on a core vehicle (52), wherein the spent fuel pod 12 comprises (i) a vertical fuel tank 10 centered in between the fore and aft sides 14, 16 of the pod 12, (ii) an outlet 18 in a floor 20 of the vertical fuel tank 10 located adjacent to a sidewall 22 on the fore side of the vertical fuel tank 10, wherein the outlet 18 is coupled to a draw tube 24 contained by the core vehicle, and (iii) a pressure release vent 26 located at the highlight 28 of the pod's duct 30, and (b) attaching a prefilled fuel pod 12 to the core vehicle (54), wherein the prefilled fuel pod 12 has the same configuration as the spent fuel pod 12.

As used herein, detaching a spent fuel pod 12 requires releasing any latching mechanism between the spent fuel pod 12 and the core vehicle of the UAV and pulling the pod 12 until it separates from the core vehicle.

As used herein, attaching a prefilled fuel pod 12 to the core vehicle requires aligning the pod 12 over the core vehicle so that the contours of the pod and core vehicle mate, applying pressure to the pod 12 until the pod 12 snaps into place with any connectors on the core vehicle, and fastening any latching mechanism between the core vehicle and the prefilled fuel pod 12.

As used herein, a prefilled fuel pod 12 means that the pod 12 contains enough fuel for the UAV's next flight mission.

Refueling the UAV according to this method allows the person who is refueling to complete the process in the dark and in a reduced timeframe compared to current methods available in the prior art.

In one embodiment, the spent fuel pod 12 has a claw configuration 38.

In one embodiment, the floor of the vertical fuel tank is horizontal 36 for a short distance relative to the pod 12 at the fore end and then transitions to an inclined floor 44 which extends to the sidewall 32 on the aft side of the vertical fuel tank 10.

The invention claimed is:

1. A vertical non-bladdered fuel tank for a ducted fan vehicle, the vertical non-bladdered fuel tank comprising:
    a pod;
    a vertical fuel tank contained by the pod, wherein the vertical fuel tank is centered between a fore sidewall and an aft sidewall of the pod, and wherein the vertical fuel tank does not enclose a bladder;
    an outlet in a floor of the vertical fuel tank located adjacent to a sidewall on a fore side of the vertical fuel tank, wherein the outlet is coupled to a draw tube; and
    a pressure release vent located at a highlight of a duct of the pod, wherein the pressure release vent is configured to allow air to enter the vertical fuel tank.

2. The vertical non-bladdered fuel tank for a ducted fan vehicle of claim 1, wherein the pod has a claw configuration.

3. The vertical non-bladdered fuel tank for a ducted fan vehicle of claim 2, wherein the floor at a fore end of the vertical fuel tank is horizontal for a short distance relative to the pod and then transitions to an inclined floor that extends to a sidewall on an aft side of the vertical fuel tank, the floor that is horizontal defining a horizontal portion.

4. The vertical non-bladdered fuel tank for a ducted fan vehicle of claim 3, wherein the inclined floor is angled at greater than zero degrees but less than or equal to 45 degrees.

5. The vertical non-bladdered fuel tank for a ducted fan vehicle of claim 3, wherein the sidewall on the fore side of the vertical fuel tank and the sidewall on the aft side of the vertical fuel tank are substantially vertical relative to the floor of the pod.

6. The vertical non-bladdered fuel tank for a ducted fan vehicle of claim 3, wherein the outlet is located at a center of the horizontal portion of the floor.

7. The vertical non-bladdered fuel tank for a ducted fan vehicle of claim 1, wherein the vertical fuel tank has a volume that is substantially equal to one third of a volume of the pod.

8. The vertical non-bladdered fuel tank for a ducted fan vehicle of claim 1, wherein the fore and aft sidewalls of the pod and the vertical fuel tank are coextensive.

9. A vertical non-bladdered fuel tank system for a ducted fan vehicle, the vertical non-bladdered fuel tank comprising:
one or more pods;
for each of the one or more pods, a vertical fuel tank contained by a respective pod of the one or more pods, wherein each vertical fuel tank is centered between a fore sidewall and an aft sidewall of the respective pod, and wherein the vertical fuel tank does not enclose a bladder;
an outlet in a floor of each vertical fuel tank located adjacent to a sidewall on a fore side of a respective vertical fuel tank, wherein the outlet is coupled to one or more draw tubes; and
for each of the one or more pods, a pressure release vent located at a highlight of the respective pod of the one or more pods, wherein the pressure release vent is configured to allow air to enter the respective vertical fuel tank of the pod.

10. The vertical non-bladdered fuel tank system for a ducted fan vehicle of claim 9, wherein the one or more pods have a claw configuration.

11. The vertical non-bladdered fuel tank system for a ducted fan vehicle of claim 10, wherein the floor of each vertical fuel tank is horizontal for a short distance relative to the respective pod at a fore end and then transitions to an inclined floor which extends to a sidewall on the aft side of the vertical fuel tank, the floor that is horizontal defining a horizontal portion.

12. The vertical non-bladdered fuel tank system for a ducted fan vehicle of claim 11, wherein the inclined floor is angled at greater than zero degrees but less than or equal to 45 degrees.

13. The vertical non-bladdered fuel tank system for a ducted fan vehicle of claim 11, wherein the sidewall on the aft side of the vertical fuel tank and the sidewall on the fore side of the vertical fuel tank are substantially vertical relative to the floor of the pod.

14. The vertical non-bladdered fuel tank system for a ducted fan vehicle of claim 11, wherein the outlet is located at a center of the horizontal portion of the floor.

15. A method for refueling a ducted fan vehicle utilizing a pod containing a vertical non-bladdered fuel tank, the method comprising:
detaching a spent fuel pod from a connector on a core vehicle, wherein the spent fuel pod comprises (a) a vertical fuel tank centered in between a fore sidewall and an aft sidewall of the pod, wherein the vertical fuel tank does not enclose a bladder, (b) an outlet in a floor of the vertical fuel tank located adjacent to a sidewall on a fore side of the vertical fuel tank, wherein the outlet is coupled to a draw tube contained by the core vehicle, and (c) a pressure release vent located at a highlight of a duct of the pod, wherein the pressure release vent is configured to allow air to enter the respective vertical fuel tank of the pod; and
attaching a prefilled fuel pod to the core vehicle, wherein the prefilled fuel pod has the same configuration as the spent fuel pod.

16. The method for refueling a ducted fan vehicle utilizing a pod containing a vertical non-bladdered fuel tank of claim 15, wherein the spent fuel pod has a claw configuration.

17. The method for refueling a ducted fan vehicle utilizing a pod containing a vertical non-bladdered fuel tank of claim 16, wherein the floor of the vertical fuel tank is horizontal for a short distance relative to the pod at a fore end of the vertical fuel tank and then transitions to an inclined floor which extends to a sidewall on an aft side of the vertical fuel tank.

* * * * *